United States Patent [19]

Laughner et al.

[11] Patent Number: 5,258,455
[45] Date of Patent: Nov. 2, 1993

[54] POLYPHENYLENE ETHER-OLEFIN POLYMER COMPOSITIONS WITH IMPROVED PROPERTIES

[75] Inventors: Michael P. Laughner, Clifton Park; James J. Scobbo, Jr., Guilderland, both of N.Y.; Marinus E. J. Dekkers, Parkersburg, W. Va.

[73] Assignee: General Electric Company, Schenectady, N.Y.

[21] Appl. No.: 918,338

[22] Filed: Jul. 21, 1992

Related U.S. Application Data

[63] Continuation-in-part of Ser. No. 698,768, May 13, 1991, abandoned.

[51] Int. Cl.$^5$ .............................................. C08L 71/12
[52] U.S. Cl. ................................... 525/68; 525/396; 525/397; 525/905
[58] Field of Search ............... 525/68, 133, 396, 397, 525/905

[56] References Cited

U.S. PATENT DOCUMENTS

| | | | |
|---|---|---|---|
| 4,816,515 | 3/1989 | Weiss | 525/68 |
| 4,931,499 | 6/1990 | Sakai et al. | 525/199 |
| 4,942,202 | 7/1990 | Zama et al. | 525/106 |
| 4,972,021 | 11/1990 | Lee, Jr. | 525/132 |
| 5,008,314 | 4/1991 | Lee, Jr. | 524/143 |
| 5,068,286 | 11/1991 | Campbell et al. | 525/92 |
| 5,081,185 | 1/1992 | Haaf et al. | 525/68 |
| 5,089,562 | 2/1992 | van der Meer et al. | 525/132 |

*Primary Examiner*—James J. Seidleck
*Assistant Examiner*—Thomas Hamilton, III
*Attorney, Agent, or Firm*—William H. Pittman

[57] ABSTRACT

Polyphenylene ether-olefin polymer compositions having improved properties are obtained by first blending an acyl group- or electrophilic group-functionalized polyphenylene ether of relatively high molecular weight with a lower molecular weight unfunctionalized polyphenylene ether to form a blend of which the lower molecular weight polymer comprises about 45-60% by weight, subsequently blending with an electrophilic group- or acyl group-functionalized olefin polymer (respectively), preferably a glycidyl methacrylate-grafted EPDM copolymer, and finally blending with a curing agent such as hexamethylenediaminemonocarbamic acid.

10 Claims, No Drawings

POLYPHENYLENE ETHER-OLEFIN POLYMER COMPOSITIONS WITH IMPROVED PROPERTIES

This application is a continuation-in-part of copending application Ser. No. 07/698,768, filed May 13, 1991, now abandoned.

This invention relates to polyphenylene ether-containing compositions, and more particularly to highly compatible compositions comprising functionalized polyphenylene ethers and functionalized olefin polymers.

Polyphenylene ethers are a well-known class of polymers characterized by a unique combination of chemical, physical and electrical properties over a temperature range of more than 350° C. extending from a brittle point of about −170° C. to a heat distortion temperature of 190° C. This combination of properties renders them suitable for use as engineering thermoplastics in a broad range of applications which are well known in the art and are disclosed in numerous patents and other publications.

It would be expected that the addition of olefin polymers to polyphenylene ethers would result in improvements in both their mechanical and impact properties. However, such resins are to a large extent incompatible. In particular, blends of polyphenylene ethers with olefin polymers in which the latter is present in even moderately high proportions demonstrate incomplete dispersion of the olefin polymer, which forms large agglomerates resulting in delamination of the blend and inferior surface appearance.

The present invention provides blends of functionalized polyphenylene ethers and functionalized olefin polymers which are characterized by high compatibility and low delamination tendency. Said blends have relatively high impact and tensile strengths and other desirable properties.

The invention includes compositions prepared by preblending (A) an acyl group- or electrophilic group-functionalized polyphenylene ether having an intrinsic viscosity greater than 0.35 dl./g. and (B) an unfunctionalized polyphenylene ether having an intrinsic viscosity in the range of about 0.15–0.35 dl./g., and subsequently blending the resulting preblend with (C) an aliphatic olefin polymer functionalized by an electrophilic group or an acyl group, respectively;

component B comprising about 45–60% of total components A and B and component C comprising about 5–40% of total components A, B and C;

all percentages being by weight, and intrinsic viscosities being determined in chloroform at 25° C.

The polyphenylene ethers employed in the present invention are known polymers comprising a plurality of structural units of the formula

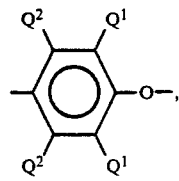

(I)

wherein in each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with (for example) 2,3,6-trimethyl-1,4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals undergo reaction in known manner with the hydroxy groups of two polyphenylene ether chains to produce a higher molecular weight polymer, provided a substantial proportion of free OH groups remains.

The polyphenylene ether employed as component A according to the present invention has an intrinsic viscosity greater than about 0.35 dl./g., most often in the range of about 0.4–0.6 dl./g.

The polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful polyphenylene ethers for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

Component A in the compositions of this invention is an acyl group- or electrophilic group-functionalized polyphenylene ether. By "acyl-functionalized" is meant a polyphenylene ether having within its molecular structure a group of the formula

(II)

wherein X is F, Cl, Br, I, OH or

R being an aliphatic or aromatic radical typically having less than about 10 carbon atoms. By "electrophilic group-functionalized" is meant a polymer having an epoxy or similar group capable of reaction with a functional group having a free electron pair.

The acyl group-functionalized polymers are preferred as component A. Acyl group-functionalized polyphenylene ethers may be prepared by either a capping reaction or a grafting reaction. Typical reactions of this type are known in the art and involve such reagents as trimellitic anhydride acid chloride (TAAC), maleic acid, fumaric acid, maleic anhydride, maleimides, maleic hydrazide, methylnadic anhydride, acrylic acid or methacrylic acid.

Another essential feature of component A is its relatively high intrinsic viscosity as compared with component B. The viscosity of component A is above about 0.35 dl./g. In general, intrinsic viscosities in the range of about 0.4–0.6 dl./g. are preferred.

Component B is low intrinsic viscosity unfunctionalized polyphenylene ether. The intrinsic viscosity of component B is in the range of about 0.15–0.35 and preferably about 0.2–0.3 dl./g.

Olefin polymers of the type represented by component C are well known, being described in U.S. Pat. Nos. such as 2,933,480, 3,093,621, 3,211,709, 3,646,168, 3,790,519, 3,884,993, 3,894,999 and 4,059,654 which are incorporated herein by reference. The preferred olefin polymers are copolymers of ethylene, $C_{3-10}$ monoolefin and a non-conjugated diene, hereinafter sometimes designated "EPDM copolymers". Suitable $C_{3-10}$ monoolefins include propylene, 1-butene, 2-butene, 1-pentene, 2-pentene, 1-hexene, 2-hexene and 3-hexene. Suitable dienes include 1,4-hexadiene as well as monocyclic and polycyclic dienes. The polyunsaturated bridged ring hydrocarbons or halogenated bridged ring hydrocarbons are preferred. Examples of such bridged ring hydrocarbons include the polyunsaturated derivatives of bicyclo(2.2.1) heptane, wherein at least one double bond is present in one of the bridged rings, such as dicyclopentadiene, bicyclo(2.2.1)hepta-2,5-diene, the alkylidene norbornenes and especially the 5-alkylidene norbornenes wherein the alkylidene group contains 1–20 and preferably 1–8 carbon atoms. Specific examples of preferred bridged ring compounds include 5-methylidene-2-norbornene, 5-ethylidene-2-norbornene, 5-n-propylidene-2-norbornene, 5-isobutylidene-2-norbornene, 5-n-butylidene-2-norbornene and 5-isobutylidene-2-norbornene.

The EPDM copolymers may contain molar ratios of ethylene to other monoolefin units from 95:5 to 5:95, with ratios from 75:25 to 90:10 often being preferred. The diene units may be present in the amount of about 0.1–10 and preferably about 0.3–1.0 mole percent.

For use as component C according to the present invention, the olefin polymer is functionalized by the presence of an electrophilic group or an acyl group, depending on whether component A contains an acyl group or an electrophilic group, respectively. It is generally preferred for component C to contain an electrophilic and especially an epoxy group.

Epoxy groups may be incorporated in component C by copolymerization (in the presence of a free radical initiator) with an ethylenically unsaturated monomer of the formula

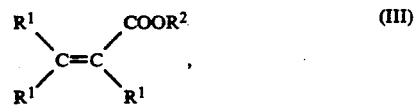

wherein $R^2$ is an organic radical containing an epoxide group (e.g., glycidyl) and each $R^1$ is independently hydrogen, $C_{1-8}$ alkyl, a $C_{6-13}$ aromatic radical or an alicyclic radical. Compounds of this type include glycidyl esters of unsaturated carboxylic acids, such as glycidyl methacrylate and glycidyl acrylate. Glycidyl methacrylate (hereinafter "GMA") is preferred.

Most often, the monomer of formula III undergoes conventional graft copolymerization with the olefin polymer for the preparation of component C. About 0.1–20% by weight of said monomer and especially about 2–10%, based on olefin polymer, is usually employed in the grafting reaction.

The compositions of this invention are prepared in two steps, the first step being preblending of components A and B. It is believed that such preblending has the effect of reducing the viscosity of the polyphenylene ether phase, thereby increasing its ability to disperse component C when the latter is subsequently added. Component B comprises about 45–60% by weight of the preblend.

The preblend is then in turn blended with component C. The latter is employed in the amount of about 5–40% by weight of the total of components A, B and C.

Any convenient type of blending operation may be employed for the two blending steps. Solution and melt blending are typical. Most often, conventional melt blending methods are convenient. They include batch operations in such equipment as Banbury mixers. It is usually preferred, however, to employ continuous melt blending as in an extruder. Typical extrusion conditions include temperatures in the range of about 240°–400° C.

It is highly preferred to employ (D) a curing agent in the blend of components A, B and C. Suitable curing agents include materials that react with residual unsaturation in the EPDM copolymer, including peroxides, sulfur and polysulfides, and compounds that react with epoxy groups therein, such as organic polyamines, polycarboxylic acids and functional derivatives thereof. Examples of suitable curing agents include hexamethylenediamine, hexamethylenediaminemonocarbamic acid, benzophenone tetracarboxylic acid dianhydride, adipic acid, maleic acid and maleic anhydride.

The amount of curing agent employed is generally about 0.1–10.0 parts per 100 parts of resinous components. It is preferably introduced in a third blending step.

The invention is illustrated by the following examples. All parts are by weight. Intrinsic viscosities were determined in chloroform at 25° C. The following materials were employed:

Component A—The reaction product of TAAC with a poly(2,6-dimethyl-1,4-phenylene ether), said reaction product having an intrinsic viscosity of 0.50–0.60 dl./g. and containing about 1-3% by weight bound TAAC.

Component B—A poly(2,6-dimethyl-1,4-phenylene ether) having an intrinsic viscosity of about 0.25 dl./g.

Component D—Hexamethylenediaminemonocarbamic acid.

Component C was a glycidyl methacrylate-grafted EPDM prepared from a commercially available EPDM containing 83% ethylene units and 5.4% ethylene norbornene units. One thousand parts of the EPDM, 60 parts of glycidyl methacrylate and 6 parts of 2,5-dimethyl-2,5-di-t-butylperoxyhexane were preblended, charged to an extruder at about 205° C. and extruded, and the extrudate was pelletized and dried.

EXAMPLES 1-2

Mixtures of equal amounts of components A and B were extruded at 300° C. The extrudates were blended with component C and reextruded at 265° C., and then blended with component D and further reextruded at 265° C.

The final extrudates were evaluated for tensile modulus, tensile elongation and notched Izod impact strength, and the surfaces of the molded test parts were examined for visible delamination. Comparison was made with a number of controls in which various components were omitted or replaced with other materials (Controls 1-4 and 6) or the extrusion conditions were varied (Control 5).

The results are given in Table I, with the controls designated "C1", etc.. "PPE" designates an unfunctionalized poly(2,6-dimethyl-1,4-phenylene ether) having an intrinsic viscosity of 0.46 dl./g., and "EPDM" designates the unfunctionalized EPDM used for the preparation of component C.

TABLE I

| | Example | | | | | | | |
|---|---|---|---|---|---|---|---|---|
| | 1 | 2 | C1 | C2 | C3 | C4 | C5* | C6 |
| Component A, % | 40 | 30 | 30 | — | 30 | 30 | 30 | 30 |
| Component B, % | 40 | 30 | — | 30 | 30 | — | 30 | 30 |
| Component C, % | 20 | 40 | 40 | 40 | — | 40 | 40 | 40 |
| Component D, phr. | 2 | 2 | 2 | 2 | 2 | 2 | 2 | — |
| PPE, % | — | — | 30 | 30 | — | — | — | — |
| EPDM, % | — | — | — | — | 40 | — | — | — |
| Polystyrene, % | — | — | — | — | — | 30 | — | — |
| Izod impact strength, joules/m. | 438 | 411 | 513 | 166 | 726 | 69 | 481 | 449 |
| Tensile modulus, GPa. | 9.24 | 4.82 | 5.17 | 4.62 | 5.38 | 5.58 | 5.03 | 6.21 |
| Tensile elongation, % | 71 | 80 | 69 | 49 | 40 | 47 | 80 | 12 |
| Visible delamination | No | No | Yes | No | Yes | No | Yes | Yes |

*Components A, B & C blended in a single extrusion, followed by a second extrusion.

An examination of the results in Table I reveals the fact that the product of Example 2 had uniformly favorable properties, while those of the controls were deficient in various ways. Controls 1, 3, 5 and 6 were all visibly delaminated; in addition, control 6 had an extremely low tensile elongation. Controls 2 and 4 were not delaminated but had extremely low impact strenghts.

EXAMPLE 3

A composition was prepared by a method similar to that of Examples 1-2, and its properties were compared with those of controls in which various proportions of component B were replaced with a higher molecular weight unfunctionalized polyphenylene ether. The results are given in Table II.

TABLE II

| | Ex. 3 | C7 | C8 | C9 |
|---|---|---|---|---|
| Component A, % | 45 | 45 | 45 | 45 |
| Component B, % | 45 | 30 | 15 | — |
| Component C, % | 10 | 10 | 10 | 10 |
| Component D, % | 2 | 2 | 2 | 2 |
| PPE, % | — | 15 | 30 | 45 |
| Izod impact strength, joules/m. | 306 | 346 | 339 | 420 |
| Tensile modulus, GPa. | 10.13 | 9.93 | 9.86 | 9.86 |
| Tensile elongation, % | 39 | 74 | 61 | 98 |
| Visible delamination | No | Yes | Yes | Yes |

The results in Table II show the importance of incorporating component B in the amount of at least 45% of the total of components A and B. Lower proportions (40%, 25% and 0%, respectively, in controls 7, 8 and 9) cause visible delamination.

What is claimed is:

1. A composition prepared by (I) preblending (A) an acyl group- or electrophilic group-functionalized polyphenylene ether having an intrinsic viscosity greater than 0.35 dl./g. and (B) an unfunctionalized polyphenylene ether having an intrinsic viscosity in the range of about 0.15-0.35 dl./g.; (II) blending the resulting preblend with (C) an aliphatic olefin polymer functionalized by an electrophilic group or an acyl group, respectively; and (III) blending the product thus formed with (D) a curing agent;

component B comprising about 45-60% of total components A and B and component C comprising about 5-40% of total components A, B and C;

all percentages being by weight, and intrinsic viscosities being determined in chloroform at 25° C.

2. A composition according to claim 1 wherein the polyphenylene ether is a poly(2,6-dimethyl-1,4-phenylene ether).

3. A composition according to claim 2 wherein component A is functionalized with an acyl group and component C with an electrophilic group.

4. A composition according to claim 3 wherein component C is a functionalized EPDM copolymer.

5. A composition according to claim 4 wherein the electrophilic group is an epoxy group.

6. A composition according to claim 5 wherein component C is a glycidyl methacrylate-grafted EPDM copolymer.

7. A composition according to claim 3 wherein component A is the reaction product of a polyphenylene ether and trimellitic anhydride acid chloride.

8. A composition according to claim 7 wherein component C is a glycidyl methacrylate-grafted EPDM copolymer.

9. A composition according to claim 8 wherein component D is employed in the amount of about 0.1–10.0 parts per 100 parts of resinous components.

10. A composition according to claim 9 wherein component D is hexamethylenediaminemonocarbamic acid.

* * * * *